March 20, 1945.    G. L. CHERRY ET AL    2,371,675
TRAY SUPPORTING TABLE
Filed March 9, 1943    4 Sheets-Sheet 1
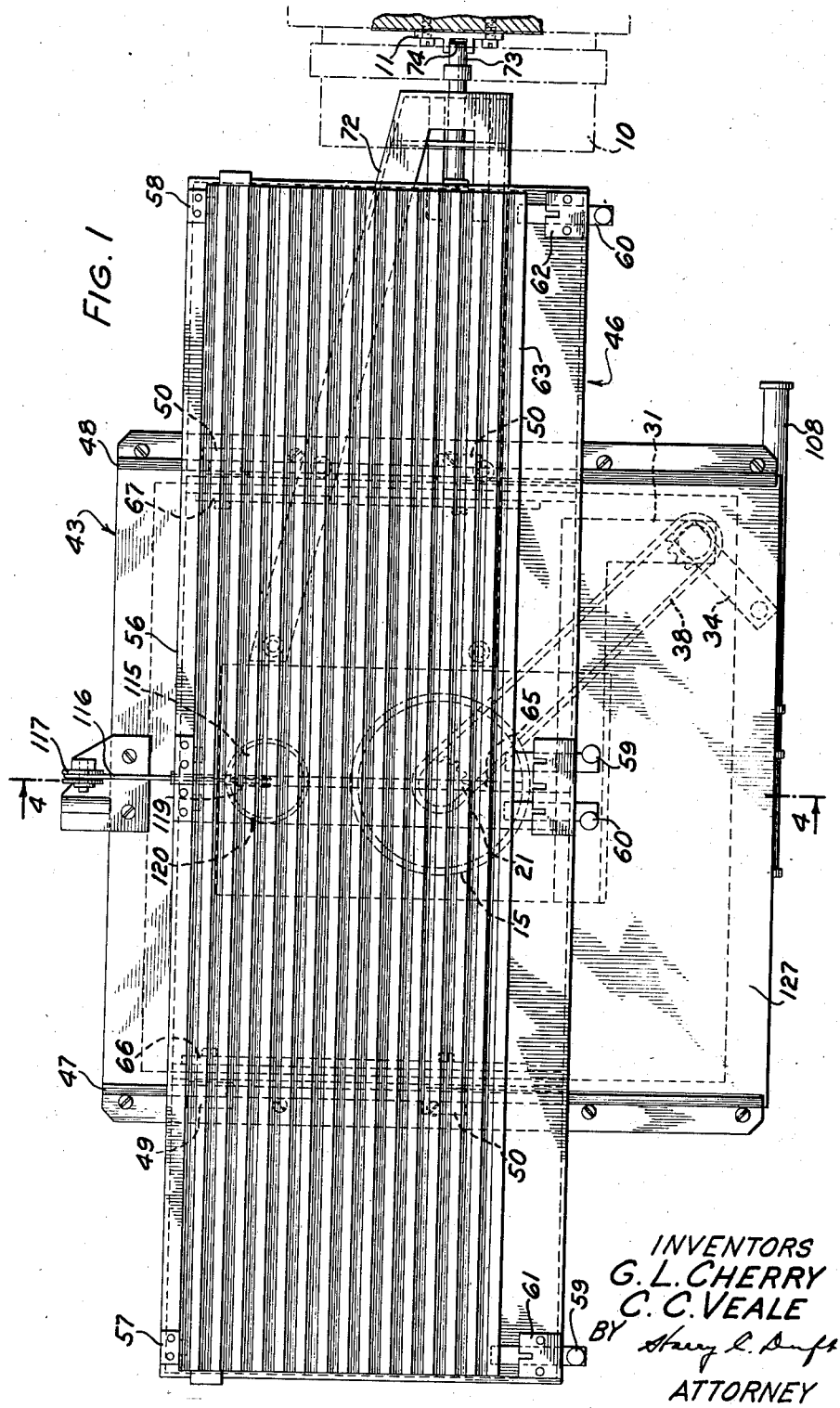
INVENTORS
G. L. CHERRY
C. C. VEALE
BY
ATTORNEY March 20, 1945.　　G. L. CHERRY ET AL　　2,371,675
TRAY SUPPORTING TABLE
Filed March 9, 1943　　4 Sheets—Sheet 2
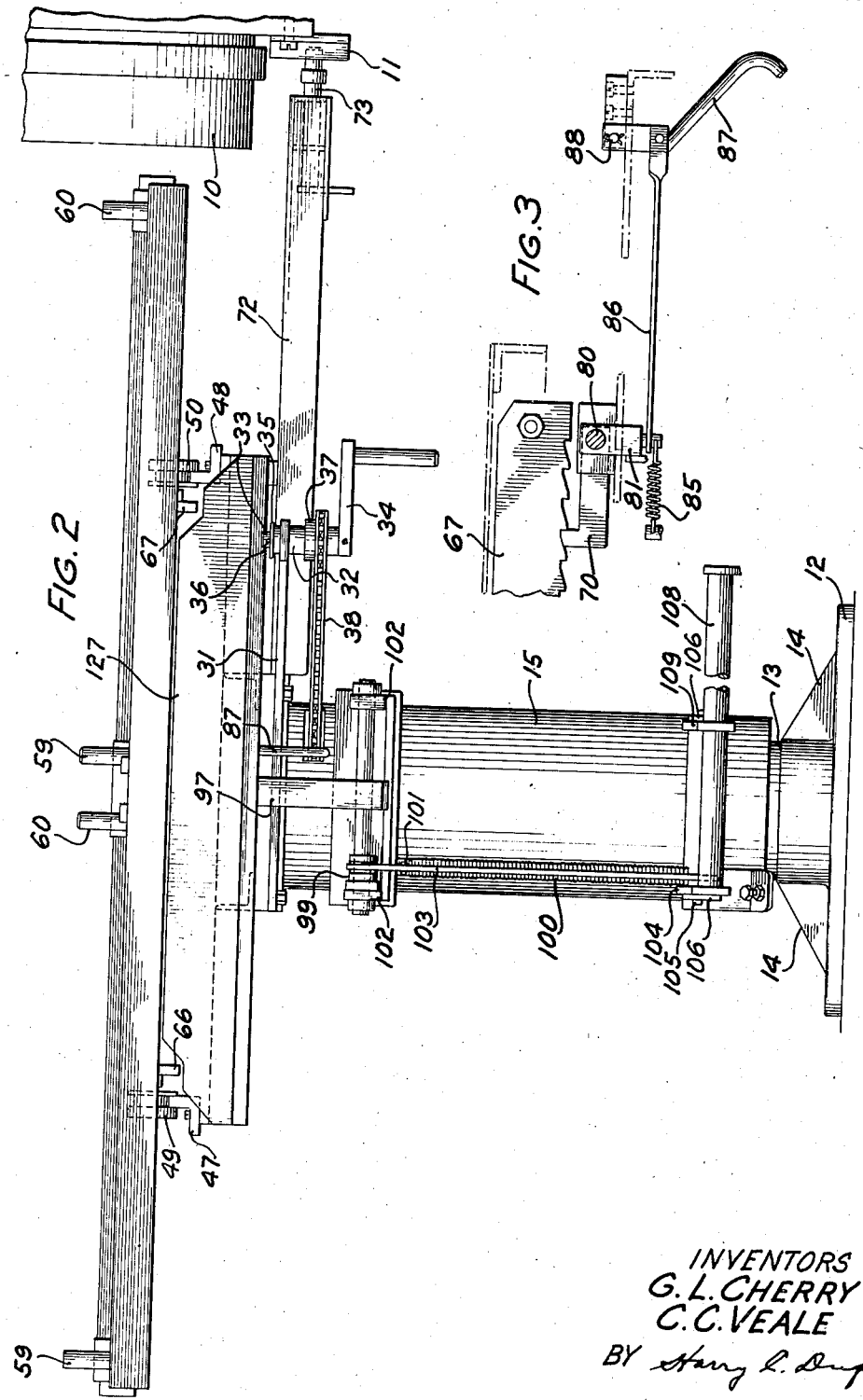
INVENTORS
G. L. CHERRY
C. C. VEALE
BY Harry L. Duft
ATTORNEY

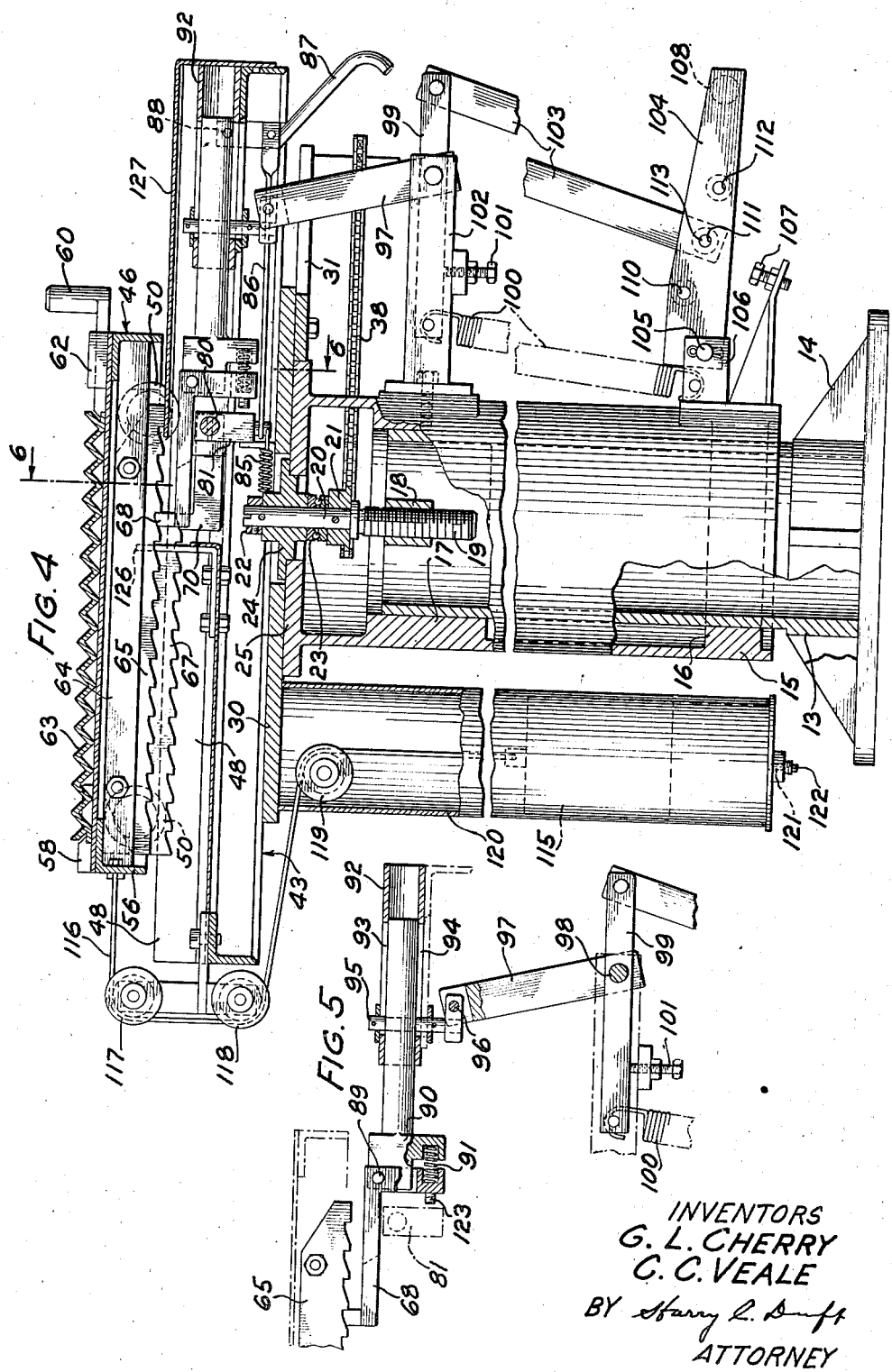

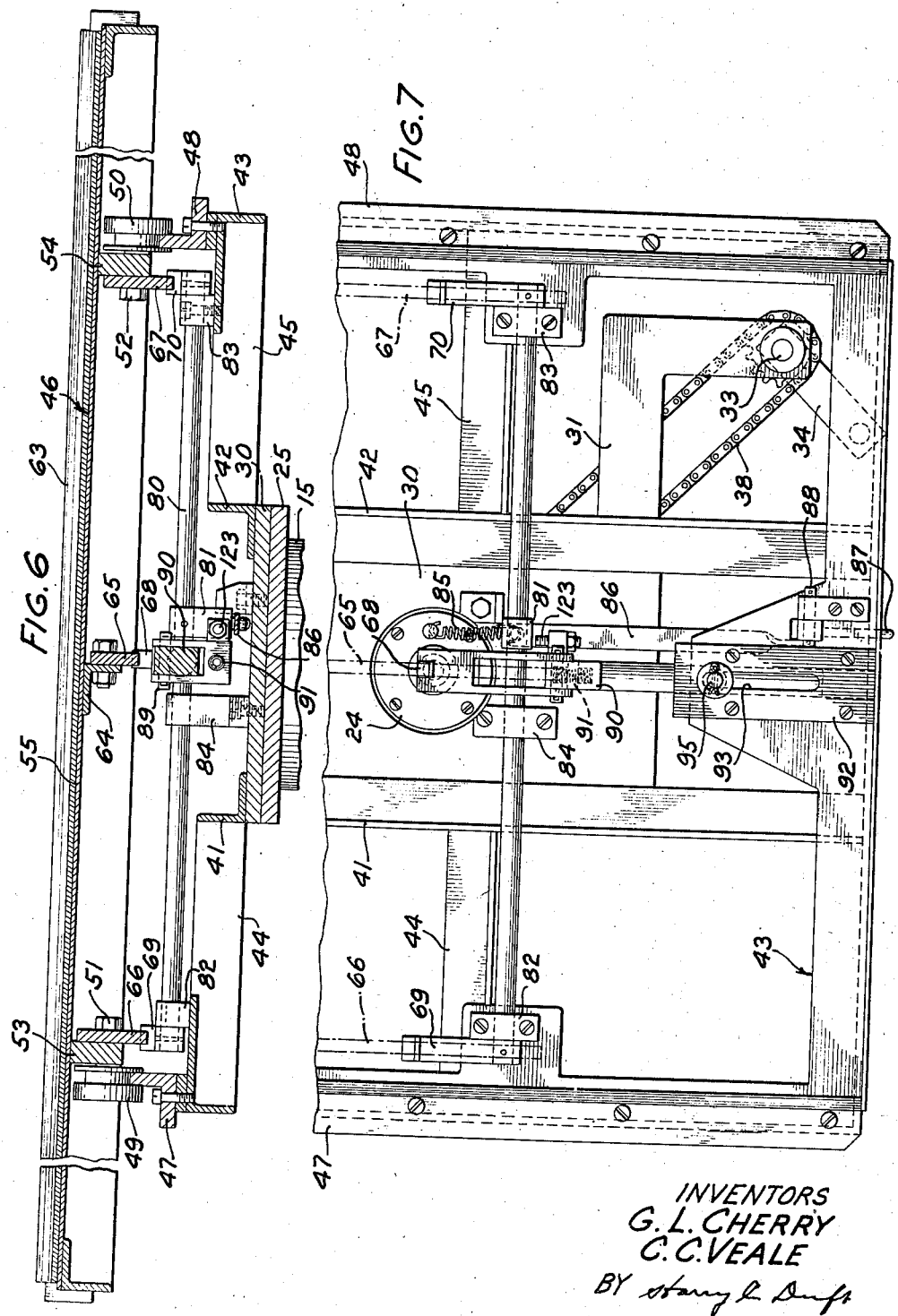

Patented Mar. 20, 1945

2,371,675

UNITED STATES PATENT OFFICE 2,371,675

TRAY SUPPORTING TABLE

George L. Cherry, Western Springs, and Charles C. Veale, West Chicago, Ill., assignors to Western Electric Company, Incorporated, New York, N. Y., a corporation of New York Application March 9, 1943, Serial No. 478,558

7 Claims. (Cl. 214—1)

This invention relates to tray supporting tables and more particularly to a table for supporting a tray for shifting movement across the face of a processing apparatus to receive processed articles in grooves formed in the tray.

It is an object of the present invention to provide a simple, efficient and readily adjustable tray supporting table.

In accordance with one embodiment of the invention as applied to a shiftable table for supporting a tray in position to receive ceramic rods extruded from an extrusion apparatus, there is provided a treadle operated drive mechanism which may be adjusted to drive a linkage through one of three different distances for each operation of the treadle whereby ratchet mechanisms driven by the treadle will shift a table step by step across the face of the extrusion apparatus to position the tray for the receipt of extruded articles, the length of each step of movement being predetermined by adusting the relationship of the treadle and linkage. In the preferred form of the invention, the height of the table may be adjusted by manipulating a chain driven supporting screw on which the table is carried and also the entire table supporting structure may be rotated to permit easy access to the extruding end of the extruding mechanism and may be latched in place with respect to the extruding mechanism during the operation thereof.

A better understanding of the invention may be had by reference to the following detailed description when considered in conjunction with the accompanying drawings, wherein Fig. 1 is a plan view of a table constituting a preferred embodiment of the invention, associated portions of the extruded press being shown in dot and dash lines;

Fig. 2 is a side elevational view of the mechanism shown in Fig. 1, showing the relative location of the table extrusion press;

Fig. 3 is an enlarged fragmentary detail view of a portion of the ratchet mechanism which may be used to move the table across the face of the press;

Fig. 4 is an enlarged vertical sectional view taken substantially along the line 4—4 of Fig. 1 in the direction of the arrows showing details of the operating mechanism whereby the tray supporting table may be actuated and whereby the table and its supporting structure may be elevated, parts being broken away to conserve space;

Fig. 5 is a fragmentary detail view, partly in section, of a portion of the driving mechanism for moving the table across the face of the extrusion press;

Fig. 6 is a vertical sectional view taken substantially along the line 6—6 of Fig. 4 in the direction of the arrows; and Fig. 7 is an enlarged fragmentary plan view of a portion of the tray supporting table showing some details of the mechanism for moving the table on an enlarged scale.

Referring to the drawings, wherein like reference characters designate the same parts throughout the several views, particular reference being had at this time to Fig. 2, wherein the end of an extrusion press 10 is shown provided with a latch plate 11, whereby the table may be locked in position with respect to the press and wherein the apparatus is shown mounted on a base plate 12. The base plate 12 has mounted on it a tubular support 13, which is braced in position by bracing members 14—14 attached to the base plate 12. The tubular support member 13 extends upwardly within a cylindrical member 15, which is slidable and rotatable with respect to the support member 13, the cylindrical member 15 being provided with inwardly extending bearing portions 16 and 17 (Fig. 4) adjacent the top and bottom thereof, which bearing members engage the outer surface of the tubular support member 13. At its upper end, the tubular support member 13 has fixed in it a threaded block 18 adapted to receive a support screw 19. The support screw 19 has a reduced portion 20 on which are fixed a sprocket 21 and a retaining collar 22. In addition to these two members, which are fixed to the reduced portion 20 of the support screw 19, the portion 20 passes through a thrust bearing 23 and a spider disc 24. The spider disc 24 is fixed to a flange or top plate 25 of the cylindrical member 15. In this manner, the relative vertical position of the cylindrical member 15 and the tubular support member 13 may be adjusted by imparting rotation to the screw 19 through rotation of its sprocket 21.

The flange or top plate 25 of the cylindrical member 15 has suitably fixed to it a main table supporting plate 30, to which there is attached an L-shaped bracket 31 (Figs. 4 and 7). The L-shaped bracket 31 has a bearing member 32 fixed to it (Fig. 2) in which a stud shaft 33 is freely rotatable. Attached to the stud shaft 33 at its lower end is a crank 34 and the stud shaft is held in place in the bearing 32 by means of a washer 35 and pin 36. Also fixed to the stud shaft 33 is a sprocket 37 for engaging and driving a chain 38, which extends around the sprocket 21 on the supporting screw 19. By means of the just described mechanism, rotation may be imparted to the screw 19 for the purpose of raising or lowering the cylindrical member 15 and all of the apparatus carried thereby.

Suitably fixed to the main table supporting plate 30 along the longest edges thereof are a pair of angle members 41 and 42 (Fig. 6). These angle members extend beyond the ends of the plate 30 and at their ends have attached to them an angle iron frame 43, which is rectangular in shape and is braced by angle members 44 and 45 which extend from the angle members 41 and 42 to the outer portions of the angle iron frame 43, thus forming a rigid structure on which a table structure, designated generally by the numeral 46, may be carried. The frame 43 has mounted on it track members 47 and 48 (Figs. 1, 6 and 7), on which flanged wheels 49 and 50 may ride. The wheels 49 and 50 are freely rotatable about the stud shafts 51 and 52, respectively, fixed to bars 53 and 54 suitably secured to the underside of a main table plate 55 forming a part of the table structure 46. The table structure 46, in addition to the main table plate 55, comprises an angle iron framework 56, rectangular in shape, and carrying on its upper surfaces retaining members 57 and 58 and cooperating latches 59 and 60 (Fig. 1), the latches 59 and 60 being slidable in brackets 61 and 62 for locking a tray 63 in position on the table 26. In addition to the bars 53 and 54 attached to the underside of the main table plate 55, there is an angle iron member 64 attached thereto for supporting a ratchet plate 65 (Fig. 6). The ratchet plate 65 cooperates with two other ratchet plates 66 and 67 in conjunction with pawls 68, 69 and 70 to control the movements of the table structure 46 across the end of the extrusion press 10. The pawls 69 and 70 are mounted upon an oscillatable shaft 80 having a lever 81 fixed to it whereby oscillation may be imparted to it. The shaft 80 is oscillatable in bearings 82 and 83 mounted on the angle iron frame 48 and a bearing 84 mounted directly on the main table supporting plate. The lever 81 is normally urged to rock clockwise by a contractile spring 85 attached to it and to the main table supporting plate 30, thus tending to urge the pawls 69 and 70 into engagement with the ratchet plates 66 and 67. A link 86 is also attached to the lower end of the lever 81 (Fig. 4) for interconnecting the lever with a manually operable lever 87, which is pivoted on the angle iron frame 43 at 88 (Figs. 4 and 7). Suitably secured to the angle iron frame 43 (Figs. 1 and 2) is a latch supporting bracket 72, in which there is slidable a latch bar 73 for engagement in a slot 74 formed in the latch plate 11. This mechanism serves to latch the frame 43 in alignment with the extrusion press 10 while the table structure 46 may be moved across the face of the press and the frame 43 may be raised or lowered to properly align the tray 63 with the press.

The pawl 68, which cooperates with the ratchet plate 65, is pivotally mounted (Fig. 5) on a pin 89, which is, in turn, mounted on the left end (Fig. 5) of a plunger 90. The pawl 68 is normally urged to rotate in a clockwise direction with respect to the plunger 90 by a compression spring 91, which is interposed between a portion of a plunger and a portion of the pawl, as shown most clearly in Fig. 5, and in this manner, the pawl is urged up into engagement with the ratchet plate 65. The plunger 90 is mounted for reciprocation in a tubular member 92, suitably attached to the upper surface of the angle iron frame 43. The tubular member 92 is provided with slots 93 and 94 for receiving an actuator pin 95, which extends through the plunger and is pivotally connected, by means of a pin 96, to a lever 97. The lever 97 is, in turn, pinned to a shaft 98, which, together with a lever 99, constitutes a bell crank normally urged to rock counter-clockwise by a contractile spring 100 to carry the lever 99 into engagement with an adjustable abutment screw 101. The screw 101 (Fig. 4) and the shaft 98 are mounted on a support bracket 102, suitably fixed to the cylindrical member 15. The lever 99 may be actuated by a link 103 attached to a treadle lever 104 which is, in turn, pivotally mounted on a pin or rod 105. The rod or pin 105 is mounted in a bracket 106 suitably mounted on a cylindrical member 15 and the cylindrical member 15 also supports an adjustable abutment screw 107, which will limit the movement of the treadle lever 104. The treadle lever 104 has a treadle bar 108 which extends through a lever 109, similar to the lever 104 and cooperates with the lever 104 to form a rigid treadle structure. The treadle lever 104 is provided with a series of three apertures 110, 111 and 112, into one of which a pin 113 mounted on the end of the link 103 may be inserted. The apertures 110, 111 and 112 are spaced apart a predetermined distance so that when the pin 113 is inserted in the aperture 110, the effective lever arm of the treadle lever 104, in actuating the link 103, will be a predetermined amount and the connecting of the pin 113 in the aperture 111 will increase the amount of motion imparted to the link 103. Correspondingly, the positioning of the pin 113 in the aperture 112 will effect a corresponding increase in the amount of movement of the link 103. Since the link 103 is positively connected through the bell crank comprising the levers 97 and 99 and shaft 98 to the pawl 68, the amount of movement imparted to the link 103 will govern the amount of movement imparted to the pawl through the action of the plunger 90 and will, therefore, determine the amount of movement imparted to the table structure 46.

The interaction of the pawls 68 and 69 and 70 with their respective ratchet plates will cause the table structure 46 to be moved from left to right (Fig. 4) and when it is desired to restore the table to its original position, the manually operable lever 87 may be moved counter-clockwise and the table structure will be drawn to the left (Fig. 4) by a weight 115, which is interconnected with the angle iron framework 56 by means of a flexible cable 116, attached to the left end of the framework 56 and to the weight 115, passing over suitably supported guide pulleys 117, 118 and 119 and being directed around the left end of the framework 43. The weight 115 is mounted in a dash pot 120 having an outlet port 121, through which a restricted amount of air may pass as controlled by a valve screw 122. In this manner, the effect of the weight 115 will be damped to prevent the table from slamming back with sufficient force to damage it when the pawls are released therefrom.

It should be noted that it is unnecessary to manipulate the pawl 68 in order to effect its release. Since the pawl will normally tend to move with the rack 65, it will, when the pawl 70 is released, be carried a slight distance to the left (Figs. 4 and 5), where an adjustable abutment screw 123, threaded into the pawl, will engage the bearing 81 and push the pawl counterclockwise about the pin 89 against the action of the spring 91, thereby to release the pawl 68 from engagement with the rack plate 65.

In stepping the tray 63 across the end of the extrusion press by actuating the pawls 68, 69 and 70, as just described, the movement of the framework 56 will be blocked by a bracket 126 when the framework reaches the end of its travel due to the engagement of the bracket therewith. Also, when the tray is in its extreme left-hand (Fig. 4) position, the driving mechanisms will be protected by a cover plate or apron 127 mounted on the frame 43.

A better understanding of the invention may be had by reference to the following brief description of the mode of operation thereof.

After suitable dies have been mounted in the extrusion press 10 to extrude rods of the desired size, the entire apparatus, constituting the present invention, having been rotated from the position shown to permit easy access to the end of the extrusion press 10, the apparatus may be rotated about the tubular supporting member 13 to return it to the position shown and may, thereupon, be locked in place by sliding the latch bar 73 into the slot 74 in the latch 11. If the tray 63 is of the proper size to receive the rod to be extruded by the extrusion press 11, the apparatus will, in all probability, have been set to operate in such a manner that the tray thereon will be fed across the face of the extrusion press in proper increments. However, if the type of rod to be extruded has been changed, a tray, having its grooves suitably spaced, may be latched in place on the table structure 46 by means of the latches 59 and 60 and the link 103 may then be shifted so that the pin 113 will be in the proper aperture 110, 111 or 112, so that the increments, by which the tray is stepped across the face of the extrusion press 10, will be of the proper size. After making the proper connection between the treadle lever 104 and link 103, the lever 87 may be manipulated to release the table structure 46 and permit it to return to its starting position. When the lever 87 is operated, the link 86 will be moved to the right (Figs. 3 and 4) thereby to rock the lever 81 counter-clockwise and move the pawls 69 and 70 out of engagement with their associated ratchet bars 66 and 67.

In addition to thus releasing the pawls 69 and 70 from their ratchet bars, the lever 81, in rocking counter-clockwise, will engage the abutment screw 123 and also rock the pawl 68 out of engagement with its ratchet bar 65, the pawl 68 moving against the action of the spring 91. After the pawls are all released from their associated ratchet bars, the weight 115 will move the table structure 46 to the left (Fig. 4) into position to start receiving articles extruded by extrusion press 10. If the rods to be extruded by the extrusion press are of a size different from those previously extruded, the height of the table will need to be adjusted and this may be done by manipulating the crank 34, thereby to raise or lower the entire angle iron frame 43. The apparatus having thus been conditioned for operation, the treadle bar 108 may be actuated each time it is desired to step the tray 63 across the face of the extrusion press and the amount that the tray will move will depend upon the manner in which the link 103 is connected to the treadle lever 104. Each time the treadle lever 104 is rocked clockwise, the bell crank, comprised of the lever 97, shaft 98 and lever 99, will also be rocked clockwise and will, through the pin 95, impart reciprocation to the tubular member 92, on the end of which the pawl 68 is pivoted. When the pawl 68 is moved to the right (Fig. 5), it will, due to its engagement with the rack bar 65, step the table structure 46 to the right, where the table structure will be latched in position by the pawls 69 and 70 engaging their rack bars 66 and 67. After a tray 63 has been loaded, it may be removed from the table structure 46 and the table structure restored to normal position, as described hereinbefore, whereupon the operation may be repeated.

What is claimed is:

1. A tray supporting table comprising a tray frame, means on said frame for attaching a tray thereto, a framework for movably supporting said tray frame, pawl means on said framework for moving the tray frame across the framework, a tubular pedestal, a cylindrical member surrounding the pedestal and rotatable thereabout for supporting the framework, and a treadle mounted on the cylindrical member for operating the pawl means.

2. A tray supporting table comprising a tray frame, means on said frame for attaching a tray thereto, a framework for movably supporting said tray frame, pawl means on said framework for moving the tray frame across the framework, a tubular pedestal, a cylindrical member surrounding the pedestal and rotatable thereabout for supporting the framework, a treadle pivotally mounted on the cylindrical means, and linkage interconnecting the treadle and part of the pawl means for actuating the pawl means.

3. A tray supporting table comprising a tray frame, means on said frame for attaching a tray thereto, a framework for movably supporting said tray frame, pawl means on said framework for moving the tray frame across the farmework, a tubular pedestal, a cylindrical member surrounding the pedestal and rotatable thereabout for supporting the framework, a treadle pivotally mounted on the cylindrical means, and a connecting mechanism operatively connected to one of said pawls and selectively connectible to the treadle for imparting selected amounts of movement to said one pawl.

4. A tray supporting table comprising a tray frame, means on said frame for attaching a tray thereto, a framework for movably supporting said tray frame, pawl means on said framework for moving the tray frame across the framework, means for rotatably supporting the framework, means rotatable with the framework for imparting movement to the pawl means, a pedestal for supporting the means for rotatably supporting the framework, and means interconnecting the pedestal and supporting means for adjusting the relative vertical position of the pedestal and the supporting means.

5. A tray supporting table comprising a tray frame, means on said frame for attaching a tray thereto, a framework for movably supporting said tray frame, pawl means on said framework for moving the tray frame across the framework, means for rotatably supporting the framework, means rotatable with the framework for imparting movement to the pawl means, a pedestal for supporting the means for rotatably supporting the framework, and means interconnecting the pedestal and supporting means for adjusting the relative vertical position of the pedestal and the supporting means, said last mentioned means including a member threaded into the pedestal and freely rotatable with respect to the means for rotatably supporting the framework.

6. A tray supporting table comprising a tray frame, means on said frame for attaching a tray thereto, a framework for movably supporting said tray frame, pawl means on said framework for moving the tray frame across the framework, means for rotatably supporting the framework, means rotatable with the framework for imparting movement to the pawl means, a pedestal for supporting the means for rotatably supporting the framework, means interconnecting the pedestal and supporting means for adjusting the relative vertical position of the pedestal and the supporting means, said last mentioned means including a member threaded into the pedestal and freely rotatable with respect to the means for rotatably supporting the framework, a chain for driving the member threaded into the pedestal, and a crank mounted on the framework for driving the chain.

7. The combination of a member having a pair of ratchet bars thereon with a drive therefor including a releasable retaining pawl resiliently urged to engage one of said ratchet bars, a pivot for supporting said retaining pawls for rocking movement, means for rocking said retaining pawl about its pivot to release it, a driving pawl for engaging the other ratchet bar, means for pivotally supporting said driving pawl, means for reciprocating said means for pivotally supporting the driving pawl, a spring for normally urging said driving pawl to rock about its pivot into engagement with its ratchet bar, and an abutment on the retaining pawl for engaging said driving pawl to rock it against the action of said spring when the retaining pawl is rocked about its pivot to release a driving pawl.

GEORGE L. CHERRY.
CHARLES C. VEALE.